United States Patent Office 3,468,922
Patented Sept. 23, 1969

3,468,922
PROCESS FOR PREPARING 1,3-BIS-(SILYL)-1,3-DIAZA-2-SILACYCLOALKANES
Walter Fink, Zurich, Switzerland, assignor to Monsanto Company, St. Louis, Mo., a corporation of Delaware
No Drawing. Filed Nov. 2, 1966, Ser. No. 591,418
Claims priority, application Switzerland, Nov. 9, 1965, 15,528/65
Int. Cl. C07f 7/02
U.S. Cl. 260—448.2                                                     10 Claims ABSTRACT OF THE DISCLOSURE
Process for making compounds of formula

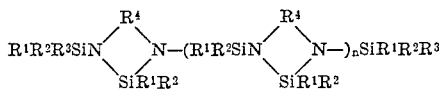

by reacting a halosilane of the formula $R^1R^2R^3SiX$ with a compound of formula

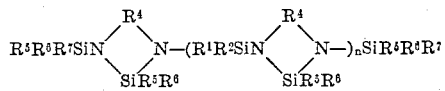

to split off halosilane. The claimed process produces compounds which are useful as high temperature resistant liquids for hydraulic oils, heat transferring fluids, lubricants and additives to lubricants.

---

The present invention relates to a process of preparing 1,3-bis-(silyl)-1,3-diaza-2-sila-cycloalkanes of the general formula (A) 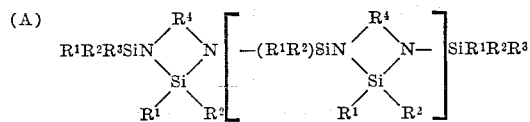

in which $R^1$, $R^2$ and $R^3$, taken individually, signify identical or different, possibly substituted alkyls, of which at least one has at least two carbon atoms if $n$ is zero, alkenyls, alkynyls, cycloalkyls, cycloalkenyls, cycloalkynyls, aralykyls, aralkenyls, aralkynyls, alkaryls, alkenylaryls, alkynylaryls, aryls or heterocyclic groups having up to 24 carbon atoms, which can also be attached to the silicon atoms through an oxygen atom. $R^3$ and, if $n$ represents zero, also $R^1$ and $R^2$, moreover, can be halogen atoms, $R^1$ and $R^2$, taken together, are members of a heterocyclic ring, $R^4$ is a possibly substituted alkylene, alkenylene, alkynylene, cycloalkylene, cycloalkenylene, cycloalkynylene, aralkylene, aralkenylene, aralkynylene, alkarylene, alkenylarylene, alkynylarylene, arylene, divalent heterocyclic group, dialkylene ether group, poly (alkylene ether) group, alkylene-arylene ether group, diarylene ether group, poly(arylene ether) group, or a group corresponding to an ether which possesses —S—, —NH—, —NR—, —NSiR¹R²R³—, —SiR¹R²—, —SO— or —SO₂— instead of the oxygen atoms, which divalent groups have the two nitrogen atoms of the 1,3-diazi-2-sila-cycloalkane ring in 1,2- or 1,3-position, or ortho- or peri-position and $n$ represents the degree of polymerization.

Normally, the R in the reactants and so the R groups in the products will each have not more than 24 carbon atoms and in many cases not more than 8 carbon atoms.

Some diazasilacycloalkane derivatives, which have on the ring nitrogen atoms hydrocarbon groups, have been known hitherto. Different than these compounds the di-azasilacycloalkane derivatives of this invention possess at each of the two nitrogen atoms of the ring a group attached through a silicon atom. Such completely silylated diazasilacycloalkane rings are hydrolytically and thermally essentially more stable and have, as a rule, lower melting points and at the same time higher boiling points, so the liquid range is greater.

As representatives of the type of the herein disclosed class of compounds as they are formulated at the beginning, only thosewith $n=0$, that is 1,3-bis-trimethylsilyl-2,2-dimethyl-1,3,2-diazasilacyclopentane, 1,3-bis-trimethylsilyl-2-methyl-2-chloro-1,3,2-diazasilacyclopentane, 1,3-bis trimethylsilyl-2,2-dichloro-1,3,2-diazasilacyclopentane and 1,3 - bis - dimethylchlorosilyl-2,2-dimethyl-1,3,2-diazasilacyclopentane [(D. Kummer and E. G. Rochow, Z. anorg. allg. Chem. 321, 21 (1963); F. A. Henglein and K. Leinhard, Makromol. Chem. 32, 218 (1959); C. H. Yoder and J. J. Zuckermann, Inorg. Chem. 4, 116 (1965)] and moreover, 1,3 - bis - trimethylsilyl-2-methyl-2-hydrogeno-1,3,2-diazasilabenzocyclopentane, 1-trimethylsilyl-2,2 dimethyl-1,3,2-diazasilabenzocyclopentane, 1 - trimethylsilyl - 2 - methyl-2-chloro-1,3,2-diazasilobenzasilabenzocyclopentane, 1-trimethylsilyl-2,2-dicyclohexyl-1,3,2-diaza-silabenzocyclopentane and 1-trimethylsilyl-2-cyclohexyl-2-chloro-1,3,2-diazasilabenzocyclopentane [D. Kummer and E. G. Rochow, Agnew. Chem. 75, 207 (1963)] have been known.

According to the indicated references, the diazasilocyclopentane derivatives have been prepared by reaction of the di-lithium salt of the N,N'-bis-trimethylsilylethylenediamine with trimethylchlorosilane, dimethyldichlorosilane or methyltrichlorosilane. The diazasilobenzocyclopentane derivatives have been prepared from N,N'-bis-trimethylsilyl-o-phenylenediamine and methylhydrogenodichlorosilane, dimethyldichlorosilane, methyltrichlorosilane, dicyclohexyldichlorosilane or cyclohexyltrichlorosilane.

The last four diazasilabenzocyclopentane derivatives still contain a hydrogen atom on one nitrogen atom of the ring, i.e. they show a NH-group. The production of such compounds in this invention is not desired, because of their low hydrolytic stability.

The other well-known compounds referred to above can be used as starting materials in the present invention.

It has further been known that there can be obtained polymeric compounds from N,N'-bis-(trimethylsilyl)-ethylenediamine and methylchlorosilanes which contain as recurring structural units the 1,3-diaza-2-sila-cyclopentane rings formulated at the beginning. As a rule, these products are highly polymeric and do not possess a uniform and definite structure. It seems that stable cyclic units are present besides unstable linear units.

With the known processes there can be prepared, not at all or only in small yields, compounds showing, for example, aromatic groups, because of the unreactivity of the corresponding aryl-chloro-silanes, or compounds having two or even three halogen atoms in the silyl groups, because of side reaction. The hitherto known methods also are not suited for the production of oligomeric compounds which contain only a small number (2 to 10) repeating ring units or definite higher polymeric compounds which are especially advantageous for the purposes indicated below. In contrast to the only known methylated analogues, the novel compounds display higher boiling points and, since most of them are liquid, also a greater liquid range. Similar compounds which have exclusively silicon-oxygen bonds, are not so stable.

The herein disclosed process uses easily available starting compounds and allows preparation of compounds which contain in the silyl groups different organic groups, especially hydrocarbon groups, heterocyclic groups, silyl groups and siloxanyl groups attached through an oxygen atom, besides corresponding groups which are attached through a carbon atom or silicon atom.

It has been found that 1,3-bis-(silyl)-1,3-diaza-2-sila-cycloalkane derivatives corresponding to the Formula A are obtained if a compound of the general formula (B) 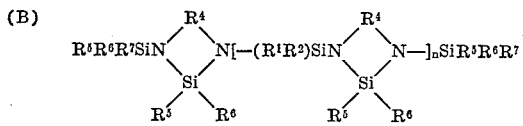

in which $R^1$, $R^2$, $R^4$ and $n$ are defined as before, $R^5$, $R^6$, $R^7$ signify hydrocarbyl groups, $R^7$ and, if $n$=zero, also $R^5$ and $R^6$, moreover, can also be halogen atoms, and the hydrocarbyl groups are chosen so that halosilane cleaved in the reaction has a lower boiling point than the halosilane be reacted, and a halosilane of the general formula (C) $\quad\quad\quad\quad R^1R^2R^3SiX$ in which $R^1$, $R^2$ and $R^3$ are defined as before and X is a chlorine atom or bromine atom, are heated until substantially no more of the halosilane splitting off during the reaction, is distilled off.

The most expedient starting compound possesses the structure $R^5$ and $R^6$=methyl, and $R^7$=chlorine atom. This compound can easily be prepared in quantitative yields from a diamine and dimethyldichlorosilane expediently in the presence of an acid-binding agent. The trimethylchlorosilane (B.P. 57.3° C.) or the dimethyldichlorosilane (P.B. 70.0° C.) which are split off in the reaction have a relatively low boiling point. The reaction of invention is an equilibrium reaction, especially if similar silanes are reacted.

The reaction proceeds better and more uniformly the greater the difference of the boiling points of the silane used and the silane splitting off and if the latter is eliminated quickly from the reaction mixture. In this manner a possible disproportionation of the silanes also is avoided.

By using the starting compound described above which, for the time, is the most expedient one, the reaction occurring may be illustrated as follows:

(a) 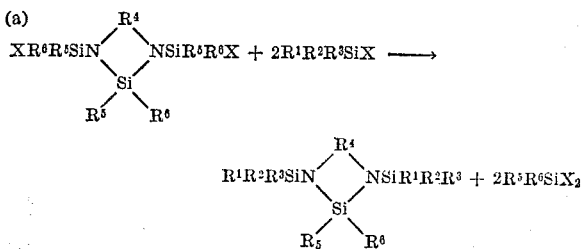

This reaction probably proceeds so that first a condensation to a polymeric compound with cleavage of $R^5R^6SiX_2$ occurs. Then by the action of the silane $R^1R^2R^3SiX$ a degradation down to the starting compound, i.e. in this case down to the monomeric compound, occurs.

It has been known that by heating of 1,3-bis-(dimethylchloro - silyl)-2,2-dimethyl-1,3-diaza-2-sila-cyclopentane a condensation up to indefinite polymeric compounds arises. It has been found that this condensation proceeds much faster in the presence of a monochlorosilane or monobromosilane, i.e., a silane containing only one active halogen atom on the silicon atom and leads to more uniform products because of chain termination.

As is evident from the equations, the dimethyldichlorosilane originally employed for the preparation of the starting compound is always restored again, rendering the process very economic.

It has further been found that it is also possible to exchange the silyl group which is a constituent of the ring. For this purpose, a halosilane having at least two active halogen atoms attached to the silicon atom is required as a reactant and also the silyl group to be cleaved should have such substituents that the formed dihalosilane possesses a boiling point as low as possible compared with the di-, tri- or tetrahalosilane reacted. Since the terminal silyl groups outside of the ring are first exchanged, there is needed triple the molar proportion of halosilane for reaction with respect to the starting product. This reaction may be illustrated as follows:

(b) 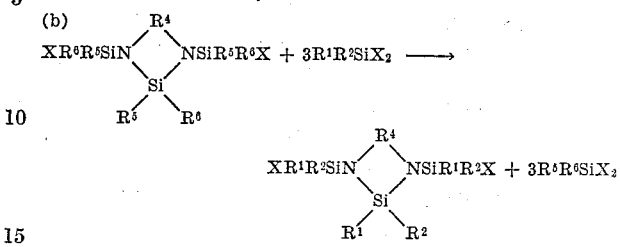

As is apparent, both the terminal silyl groups now possess a halogen atom. The compound which is obtained according to the equation (b) can be reacted with a monohalosilane so the end product no longer contains halogen atoms.

This exchange of all silyl groups is as a matter of principle feasible also with dimeric to polymeric starting compounds. However, the process has less importance in this instance, because chain degradation can easily occur and generally the end products are less uniform. Consequently, only the terminal silyl groups should be exchanged by using a molar ratio of 1:2 instead of 1:3.

Using easily preparable starting compounds (B) there can be produced by the present process analogous compounds containing on one, on both or on all three silicon atoms other organic groups than have been present formerly.

Moreover, there can be produced compounds containing besides other organic groups simultaneously also other halogen atoms than, e.g., chlorine atoms. This will be demonstrated below:

(c) 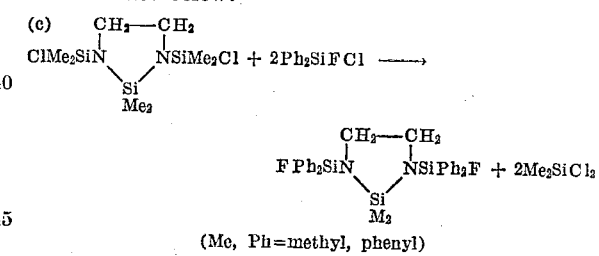

(Me, Ph=methyl, phenyl)

In similar manner there are obtained with, e.g., $$PhSiF_2Cl$$

or with $SiB_4$ the analogoues having 2 fluorine atoms, or 3 bromine atoms, respectively, in the terminal silyl groups. The reaction with a silane containing at least three reactive halogen atoms can finally lead to products which have one halogen atom or even two halogen atoms, on the silicon atoms of the ring.

However, the latter ones are limited to the bromine and iodine atoms because only $SiBr_4$ (B.P. 153° C.) and $SiI_4$ (B.P. 290° C.) have higher boiling points than the dimethylbromochlorosilane, or dimethyliodochlorosilane, respectively, which are split off.

Chlorine atoms still present after the exchange of the silyl groups can also be exchanged for other halogen atoms in a separate step by reacting with, e.g., alkali fluorides, alkali bromides and alkali iodides in a solvent like, e.g., nitromethane or acetonitrile.

The prepartion of the starting compound (B) in which $R^5$ and $R^6$ are methyl groups and $R^7$ is a chlorine atom is well known. This compound is obtained by reacting a diamine with dimethyldichlorosilane. Instead of dimethyldichlorosilane also other organic chlorosilanes, especially those which can be prepared expediently by a direct synthesis, can be used. Examples are diethyldichlorosilane, di-n-propyldichlorosilane, di-iso-propyldichlorosilane, divinyldichlorosilane and 1 - dichlorosilacyclopentene. In general, the starting compounds contain lower alkyls in the silyl group to be replaced, so that the halosilane splitting off possesses an appreciably lower boiling point than the halosilane to be reacted.

The starting compounds can be prepared, however, also in a two-step reaction in that there is reacted first a diamine with a lower dialkyldichlorosilane of the formula $R^5R^6SiX_2$ (e.g. dimethyldichlorosilane) or with a trialkylchlorosilane of the formula $R^5R^6R^7SiX$ (e.g. trimethylchlorosilane) to afford the corresponding N,N'-disilyldiamine which subsequently is cyclized using an organic dichlorosilane of the formula $R^1R^2SiX_2$ (e.g. diphenyldichlorosilane). The dimeric and oligomeric starting compounds may be prepared conveniently according to U.S. patent application Ser. No. 563,693, filed July 8, 1966.

The halosilanes serving for the exchange correspond to the Formula C set forth before. Examples of the groups $R^1$, $R^2$ and $R^3$ are halogen atoms like fluorine, bromine and iodine atoms; alkyls, alkenyls and alkynyls such as methyl, ethyl, vinyl, ethynyl, n-propyl, iso-propyl, allyl, propenyl, propargyl, propynyl, n-butyl, iso-butyl, sec-butyl, tert-butyl, methallyl, 1-butenyl, crotyl, butadienyl, 1-butynyl, 2-butynyl, 1-buten-2-ynyl and higher aliphatic groups having up to 24 carbon atoms such as undecenyl, dodecyl, myristyl, oleyl and tetracosyl; moreover cycloalkyls, cycloalkenyls and cycloalkynyls such as cyclobutyl, cyclopentyl, cyclopentenyl, cyclopentadienyl, cyclohexyl, cyclohexenyl, cyclohexadienyl, cyclohexynyl and larger alicyclic groups having up to 12 carbon atoms such as cyclooctyl, cyclododecyl, cyclooctatrienyl, cyclododecatrienyl and bicyclohexyl; moreover aralkyls, aralkenyls and aralkynyls such as benzyl, cuminyl, phenylethyl, styryl, phenylethynyl, phenylpropyl, 3-phenylallyl, 2-phenylallyl, 1-phenylallyl, cinnamyl, 1-phenylpropynyl, 1-phenylpropargyl, diphenylmethyl, triphenylmethyl, α-naphthylmethyl, β-naphthylmethyl, 1-(α-naphthyl)ethyl, 2-(α-naphthyl)ethyl, 1 - (β - naphthyl)ethenyl, 2 - (β - naphthyl)-ethyl, 1 - (α-naphthyl)ethyl, 2 - (α-naphthyl)ethenyl, 1-(β-naphthyl)ethenyl, 2-(β-naphthyl)ethenyl, α-naphthylethynyl, and β-naphthylethynyl; moreover alkaryls, alkenylaryls and alkynylaryls such as tolyl, xylyl, mesityl, duryl, ethylphenyl, cumyl, vinylphenyl, ethynylphenyl, propargylphenyl, propynylphenyl, tert-butylphenyl, α-vinylnaphthyl, β-vinylnaphthyl, α-ethynylnaphthyl and β-ethynylnaphthyl; moreover aryls such as phenyl, o-biphenylyl, m-biphenylyl, p-biphenylyl, m-terphenylyl, p-terphenylyl, 1-naphthyl, 2-naphthyl, 2-anthryl, 9-anthryl, 1-phenanthryl, 2-phenanthryl, 3-phenanthryl, 4-phenanthryl, 9-phenanthryl, indanyl, indenyl; moreover heterocyclic groups such as pyrryl, furyl, tetrahydrofuryl, benzofuryl, thienyl, pyrrolinyl, pyrrolidyl, pyrazolyl, pyrazolinyl, pyrazolidyl, imidazolyl, imidazolidyl, benzimidazolyl, thiazolyl, oxazolyl, iso-oxazolyl, triazolyl, pyrazinyl, pyrimidyl, pyridazinyl, pyridyl, pyranyl, thiopyranyl, piperidyl, morpholinyl, thiazinyl, triazinyl, quinolyl, quinazolyl, indolyl, phenazinyl, carbazolyl.

The number of known organic halosilanes which can be used herein is very great. Some typical representatives having organic groups as enumerated above are: ethyltrichlorosilane, diethyldichlorosilane, triethylchlorosilane, vinyltrichlorosilane, divinyldichlorosilane, trivinylchlorosilane, bromoethylnyltrichlorosilane, 1 - butyn - 3 - enyltrichlorosilane, bis(1 - butyn - 3 - enyl)-dichlorosilane, dicyclohexyl - phenyl - chlorosilane, phenyltrichlorosilane, diphenyldichlorosilane, triphenylchlorosilane, p-n-dodecylphenyltrichlorosilane, 3,5-di-n-amylphenyl-trichlorosilane, di-(2-thienyl)-dichlorosilane and di-(2-pyridyl)-dichlorosilane.

Of course, the halosilanes may also have different groups of the above enumerated ones, like, e.g., phenyl 1 - 2 - thienyl - dichlorosilane, benzyl-n-propyl-1-naphthyl-chlorosilane and benzyl-methyl-hydrogeno-chlorosilane. Examples of well known halosilanes in which $R^1$ and $R^2$ taken together are members of a heterocyclic ring, i.e., form with their silicon atom a heterocyclic ring are 1,1-dichlorosilacyclobutane, 1 - chloro - 1 - fluorosilacyclobutane, 1,1 - dichlorosilacyclopentane, 1 - chloro - 1 - methylsilacyclopentane, 1,1 - dichlorosilacyclopentene, 1,1-dichlorosilacyclohexane, 1 - chloro - 1 - phenylsilacyclohexane, 1 - chloro - 1 - fluorosilacyclohexadiene, and 1,1 - dichlorosilacycloheptatriene.

It has been found that the enumerated hydrocarbyl groups and heterocyclic groups can also show substituents which do not hinder the reaction of invention, i.e., the exchange of the silyl groups. Examples of such substituents in well known silanes are: Cl, Br, I, F, —OR, —CO, —NR$_2$, —CN and —NO$_2$ (R=organic group as defined for $R^1$).

Examples of some halogenated hydrocarbyl groups are: chloromethyl, dichloromethyl, trichloromethyl, bromomethyl, dibromomethyl, tribromomethyl, fluoromethyl, difluoromethyl, trifluoromethyl, 1-chloroethyl, 2-chloroethyl, 1-bromoethyl, 2-bromoethyl, 1-fluoroethyl, 2-fluoroethyl, 1,2-dichloroethyl, 1,2-difluoroethyl, 2-trichloroethyl, 2-trifluoroethyl, pentafluoroethyl, 2-chlorovinyl, 1-chlorovinyl, 1,2-dichlorovinyl, trichlorovinyl, trifluorovinyl, bromophenyl, fluorophenyl, difluorophenyl, trifluorophenyl, pentafluorophenyl, trichloromethylphenyl and bis(trifluoromethyl)phenyl. Other hydrocarbyl and also heterocyclic groups than the above enumerated ones can be halogenated in similar manner.

The number of substituted halosilanes, which can be used herein, is also very large. Known examples are: pentafluoromethyldichlorosilane, 1,2-dichlorovinyltrichlorosilane, p-chlorophenylvinyldichlorosilane, bis-(p-fluorophenyl)-dichlorosilane, bis-(3,5-dibromophenyl)-methylchlorosilane, [tris-(3,5-bis-trifluoromethyl)-phenyl]-chlorosilane, p-methoxyphenyltrichlorosilane, 2-methoxy-5-bromophenyltrichlorosilane, phenoxyphenylpropyltrichlorosilane, p - dimethylaminophenylmethyldichlorosilane, methyl-β-cyanoethyldichlorosilane and tris-(acetylacetonyl)-chlorosilane.

It has already been mentioned that the reaction of invention proceeds through polymeric intermediary products. By taking advantage of this knowledge, it has been possible to effect an exchange of the silyl groups and a degradation of the chain down to dimeric and oligomeric compounds. Thus, starting with monomeric or highly polymeric compounds, by this way there can be obtained novel dimeric to oligomeric products.

In order to get monomeric compounds the molar ratio of the starting compound having $n$=zero to the mono- or dihalosilane reacted should be 1:2, whereby both the terminal silyl groups will be replaced. If a 1:1 ratio by using a monohalosilane is used, there is formed mainly a dimeric product. This will be illustrated hereafter by an example:

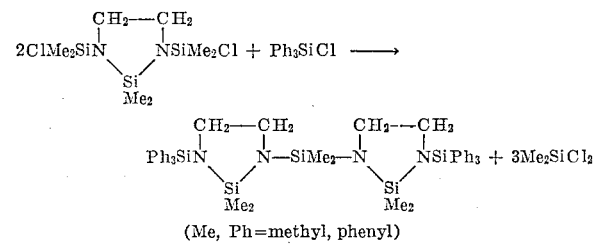

(Me, Ph=methyl, phenyl)

In the same manner, there can be obtained trimeric and oligomeric compounds by further increasing the quantity of monohalosilane. The proportions to be employed are $(n+1):2$, if $n$ possesses the significance shown in this description at the beginning. Moreover, higher members can also be obtained by condensation on starting with dimeric, trimeric, tetrameric, etc., compounds if the quantity of halosilane to be reacted is chosen accordingly. In general, this reaction proceeds so that the next lower and higher members are simultaneously formed as by-products. The reaction (d), i.e., the building up of the chain is, however, not feasible with di- or trihalosilanes with the exception that besides a reactive chlorine atom or bromine atom there are present non-reactive fluorine atoms as in, for example, the compounds RSiF₂Cl, R₂SiFCl, RSiF₂Br and R₂SiFBr (R=organic group as defined for R¹).

In carrying out the reaction, the starting compound (B) and a halosilane (C) are used in a suitable proportion are heated until no more substantial amount of the halosilane splitting off in the reaction and which is more volatile than the halosilane reacted, can be distilled off from the reaction mixture. In general, reaction temperatures between about 150° and 400° C. are employed. The reaction is expediently carried out without a solvent and with exclusion of moisture and oxygen, e.g., in an atmosphere of nitrogen. In order to avoid a violent reaction it may be expedient to add gradually the halosilane (C) at higher temperature. The separation of the end products can be achieved in usual manner by fractional distillation or crystallization.

By the process of invention, there are available novel monomeric to polymeric compounds which are useful as high temperature resistant liquids for hydraulic oils, heat transferring fluids, lubricants and additives to lubricants. When exchangeable halogen atoms are present, the products can undergo further reactions.

Example 1

A mixture consisting of 22.6 g. (0.075 mole) of 1,3-bis-(dimethyl - chlorosilyl) - 2,2 - dimethyl - 1,3 - diaza - 2-silacyclopentane and 37.96 g. (0.15 mole) of diphenyl-dichlorosilane is heated in a nitrogen atmosphere. A vigorous evolution of dimethyl-dichlorosilane begins at about 160° C. The temperature is increased to 360° C. within about 30 minutes. The quantity of dimethyl-dichlorosilane recovered is 17.5 ml. (95.6% of theory). After cooling hexane is added to the mixture and the separating crystals are filtered off and dried. Yield 4.1 g. of 1,3-bis-(diphenyl-chlorosilyl) - 2,2 - diphenyl - 1,3 - diaza - 2 - silacyclopentane; M.P. 220° C. The filtrate is fractionally distilled. Yield 36.3 g. (88.0%) of 1,3-bis-(diphenyl-chlorosilyl)-2,2-dimethyl-1,3-diaza-2-silacyclopentane; B.P. 229–230° C./0.01 mm.

Analysis C₂₈H₃₀N₂Si₃Cl₂.—Calc'd percent: C, 61.17; H, 5.50; N, 5.10; Cl, 12.90; mol. weight 549.75. Found percent: C, 60.63; H, 5.47; N, 5.38; Cl, 12.81; mol. weight 510.

Example 2

A mixture consisting of 100.8 g. (0.335 mole) of 1,3-bis - (dimethyl - chlorosilyl) - 2,2 - dimethyl - 1,3 - diaza-2-silacyclopentane and 254 g. (1 mole) of diphenyl-dichlorosilane is heated at 360° C. The quantity of dimethyl-dichlorosilane recovered is 115.2 ml. (95% of theory). Hexane is added, the mixture is stirred for 2 hours, the precipitating crystals are filtered off and dried. Yield 186 g. (82.5%) of 1,3-bis-(diphenyl-chlorosilyl)-2,2-diphenyl-1,3-diaza-2-silacyclopentane; M.P. 220° C. (from cyclohexane or benzene).

Analysis C₃₈H₃₄N₂Si₃Cl₂.—Calc'd percent: C, 67.73; H, 5.09; N, 4.16; Cl, 10.52; mol. weight 673.89. Found percent: C, 68.09; H, 5.12; N, 4.26; Cl, 10.2; mol. weight 658. The product is identical with one of the products obtained according to Example 1.

Example 3

A mixture of 22.6 g. (0.075 mole) of 1,3-bis-(dimethyl-chlorosilyl)-2,2-dimethyl-1,3-diaza-2 - silacyclopentane and 31.72 g. (0.15 mole) of phenyl-trichlorosilane is heated within 15 minutes up to 240° C. The quantity of dimethyl-dichlorosilane recovered is 18 ml. (100% of theory). The mixture is fractionally distilled. Yield 31.3 g. (89.5%) of 1,3-bis-(phenyl-dichlorosilyl)-2,2-dimethyl - 1,3 - diaza-2-silacyclopentane; B.P. 179–181° C./ 0.1 mm.

Analysis C₁₆H₂₀N₂Si₃Cl₄.—Calc'd percent: C, 41.20; H, 4.32; N, 6.00; Cl, 30.41; mol. weight 466.45. Found percent: C, 41.18; H, 4.41; N, 6.11; Cl, 30.00; mol. weight 429.

Example 4

A mixture consisting of 22.6 g. (0.075 mole) of 1,3-bis - (dimethyl - chlorosilyl) - 2,2 - dimethyl - 1,3 - diaza-2-silacyclopentane and 25.6 g. (0.15 mole) of phenyl-dimethyl-chlorosilane is heated within 18 hours up to 230° C. The quantity of dimethyl-dichlorosilane recovered is 15.5 ml. (86.1% of theory). The mixture, after addition of hexane and charcoal, is stirred at ambient temperature for 3 hours, then filtered and fractionally distilled. There are obtained a main fraction; B.P. 130–160° C./0.02 mm., and a last fraction; B.P. 210–260° C./0.02 mm. The main fraction is distilled again. Yield 18.1 g. (62.7%) of 1,3-bis-(phenyldimethylsilyl)-2,2-dimethyl-1-diaza-2-silacyclopentane; B.P. 145° C./0.01 mm.; $n_D^{20}$ 1.5650.

The last fraction is also distilled again. The distillate crystallizes after several days. Yield 4.3 g. of bis-[3- phenyl-dimethylsilyl-2,2-dimethyl-1,3-diaza - 2 - silacyclopentyl-(1)]-dimethylsilane; B.P. 217° C./0.04 mm.; $n_D^{20}$ 1.5650; M.P. 73–74° C.

Example 5

A mixture consisting of 22.6 g. (0.075 mole) of 1,3-bis-(dimethyl-chlorosilyl) - 2,2 - dimethyl - 1,3 - diaza-2-silacyclopentane and 12.79 g. (0.075 mole) of phenyl-dimethyl-chlorosilane is heated up to 240° C. within 10 hours. The reaction is stopped after 13.57 ml. (100% of theory) of dimethyl-dichlorosilane are recovered. The mixture is fractionally distilled. There are obtained 3 fractions: (I) Yield 7.1 g. of 1,3-bis-(phenyl-dimethylsilyl)-2,2-dimethyl-1,3-diaza - 2 - silacyclopentane. The product is identical with that obtained from the main fraction according to Example 4. (II) Yield 8.2 g. (36.4%) of bis[3-phenyl-dimethylsilyl-2,2-dimethyl-1,3-diaza-2-silacyclopentyl (1)]-dimethylsilane. The product is identical with that obtained from the last fraction according to Example 4. (III) Yield 4.2 g. of

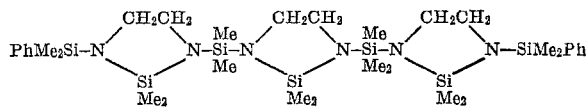

where Ph=phenyl and Me=methyl; B.P. 265–270° C./ 0.06 mm.; $n_D^{20}$ 1.5160.

Analysis.—Calc'd percent: C, 52.68; H, 8.84; N, 11.52; mol. weight 729.54. Found percent: C, 52.88; H, 8.51; N, 11.20; mol. weight 691.

What I claim is:

1. A process for preparing 1,3-bis-(silyl)-1,3-diaza-2-silacycloalkane derivatives of the general formula

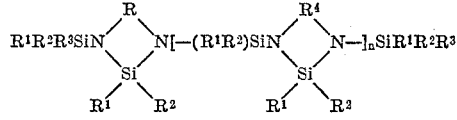

in which R¹, R² and R³ are hydrocarbyl groups and these hydrocarbyl groups can have substituents such as halogens, —OR, —CO, —NR₂, —CN and —NO₂ wherein R is a hydrocarbyl group at least one of which has at least two carbon atoms R³ and, if n=zero, also R¹ and R² can also be halogen atoms, R⁴ is a group which can be substituted with the same substituents as R¹ and which is a hydrocarbylene group, dihydrocarbylene ether group, poly(hydrocarbylene ether) group, or a group corresponding to an ether which possesses —S—, —NH—, —NR—, —NSiR¹R²R³—, —SiR¹R²—, —SO— or —SO₂— instead of the oxygen atom where R is a hydrocarbyl group, which divalent groups have the two nitrogen atoms of the 1,3-diaza-2-sila-cycloalkane ring in 1,2- or 1,3-position, or ortho- or peri-position, and n is a number of zero or 1 to 9, comprising reacting a compound 1 of the general formula

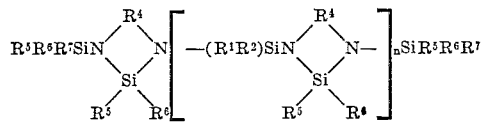

in which $R^1$, $R^2$, $R^4$ and $n$ are defined as above, $R^5$, $R^6$ and $R^7$ are hydrocarbyl groups which can be substituted with the same groups as $R^1$, $R^7$ and, if $n=$zero, also $R^5$ and $R^6$ can be halogen atoms, provided the hydrocarbyl groups are chosen so that halosilane cleaved in the reaction has a lower boiling point than the halosilane to be reacted, and a halosilane of the general formula $$R^1R^2R^3SiX$$

in which $R^1$, $R^2$ and $R^3$ are defined as before and X is a chlorine atom or bromine atom, are heated until no more substantial amount of the halosilane splitting off during the reaction, can be distilled off from the reaction mixture.

2. A process of claim 1 wherein a monochlorosilane or monobromosilane is used in a molar ratio of 1:2 of compound 1 to halosilane.

3. A process of claim 1 wherein a monochlorosilane or monobromosilane is used in a molar ratio in the range of 1:1 to 9:2 of compound 1 to halosilane.

4. A process of claim 1 wherein a starting compound having $n=0$ and a dichlorosilane or dibromosilane are used in a molar ratio of 1:2 of compound 1 to halosilane.

5. A process of claim 1 wherein a starting compound having $n=0$ and a dichlorosilane or dibromosilane are used in a molar ratio of at least 1:3 of compound 1 to halosilane.

6. A process of claim 1 wherein $R^5$ and $R^6$ are methyl, $R^7$ is chloro, $R^4$ is —$CH_2CH_2$—, $n$ is 0, $R^3$ is chloro, the molar ratio of compound 1 to halosilane is 1:2, the heating is at a sufficiently high temperature to replace the terminal non-ring silyl groups, $R^1$ and $R^2$ attached to the ring silicon atom are methyl, the other $R^1$ and $R^2$ groups are phenyl and X is chloro.

7. A process of claim 1 wherein $R^5$ and $R^6$ are methyl, $R^7$ is chloro, $R^4$ is —$CH_2CH_2$—, $n$ is 0, $R^1$ and $R^2$ are phenyl, $R^3$ is chloro, the molar ratio of compound 1 to halosilane is about 1:3, heating is to a sufficiently high temperature to replace the ring silyl group and X is chloro.

8. A process of claim 1 wherein $R^5$ and $R^6$ are methyl, $R^7$ is chloro, $R^4$ is —$CH_2CH_2$—, $n$ is 0, $R^1$ and $R^2$ attached to the ring silicon atom are methyl, the other $R^1$ groups are phenyl, the other $R^2$ groups are chloro, $R^3$ is chloro, the molar ratio of compound 1 to halosilane is 1:2, the heating is at a sufficiently high temperature to replace the terminal non-ring silyl groups and X is chloro.

9. A process of claim 1 wherein $R^5$ and $R^6$ are methyl, $R^7$ is chloro, $R^4$ is —$CH_2CH_2$—, $n$ is 0, $R^1$ and $R^2$ are methyl for the ring silicon atoms, the other $R^1$ groups are phenyl, the other $R^2$ groups and $R^3$ are methyl, the molar ratio of compound 1 to halosilane is 1:2, X is chloro and heating is at a sufficiently high temperature to replace the terminal non-ring silyl groups.

10. A process of claim 1 wherein $R^5$ and $R^6$ are methyl, $R^7$ is chloro, $R^4$ is —$CH_2CH_2$—, $n$ of compound 1 is 0, $n$ of the product is 2, $R^1$ and $R^2$ of the ring silyl groups and of the ring-connecting silyl groups are methyl, $R^1$ of the terminal silyl groups is phenyl, $R^2$ and $R^3$ of the terminal silyl groups is methyl, X is chloro, the molar ratio of compound 1 to halosilane is 1:1 and heating is at least sufficient to replace the terminal silyl groups.

References Cited

UNITED STATES PATENTS

| | | | |
|---|---|---|---|
| 3,170,941 | 2/1965 | Speier | 260—448.2 |
| 3,297,592 | 1/1967 | Fink | 260—448.2 XR |

TOBIAS E. LEVOW, Primary Examiner

J. P. PODGORSKI, Assistant Examiner

U.S. Cl. X.R.

252—49.6, 78; 260—46.5